A. B. SMITH.
DOWEL PIN AND MORTISE LOCK.
APPLICATION FILED NOV. 23, 1916.
1,251,298. Patented Dec. 25, 1917.
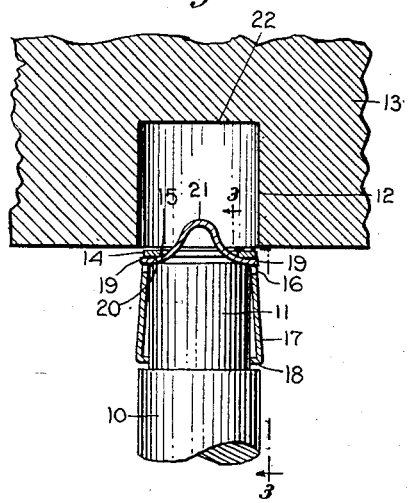
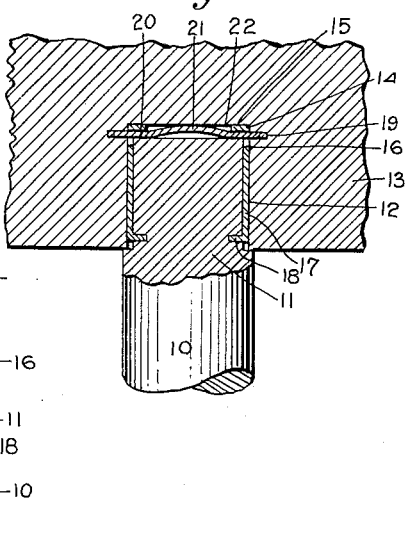
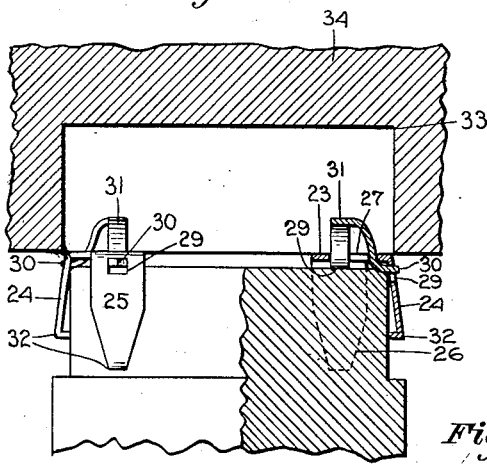
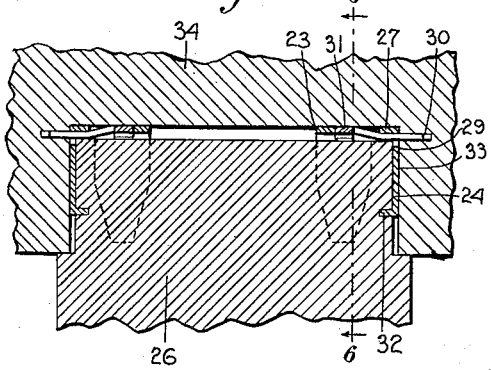
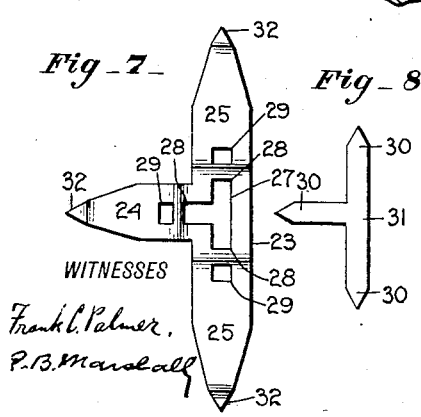
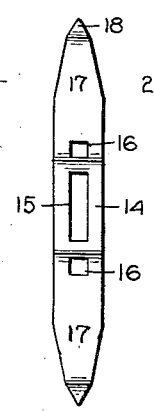
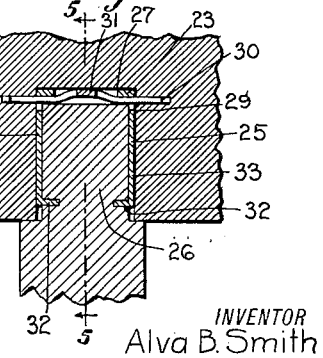
INVENTOR
Alva B. Smith

UNITED STATES PATENT OFFICE.

ALVA BERNARD SMITH, OF MEMPHIS, TENNESSEE, ASSIGNOR, BY DIRECT AND MESNE ASSIGNMENTS, TO STEEL GRIP COMPANY, A CORPORATION OF DELAWARE.

DOWEL-PIN AND MORTISE-LOCK.

1,251,298.  Specification of Letters Patent.  Patented Dec. 25, 1917.

Application filed November 23, 1916.  Serial No. 133,001.

*To all whom it may concern:*

Be it known that I, ALVA B. SMITH, a citizen of the United States, and a resident of Memphis, in the county of Shelby and State of Tennessee, have invented a new and Improved Dowel-Pin and Mortise-Lock, of which the following is a full, clear, and exact description.

My invention has for its object to provide improvements in dowel pins and mortise locks which are strong and durable, although very cheap to manufacture, the construction being such that the dowel pin and mortise lock may be used under all conditions without danger of splitting the wood.

Additional objects of the invention will appear in the following specification, in which the preferred form of the invention is described.

In the drawings similar reference characters denote similar parts in all the views, in which—

Figure 1 is a sectional view illustrating the manner in which one form of the invention is used;

Fig. 2 is a view similar to that illustrated in Fig. 1, but with the dowel pin moved home;

Fig. 3 is a view of the dowel pin and mortise lock on the line 3—3 of Fig. 1;

Fig. 4 is a sectional view illustrating a modified form of the invention;

Fig. 5 is a sectional view on the line 5—5 of Fig. 6;

Fig. 6 is a sectional view on the line 6—6 of Fig. 5;

Fig. 7 is a view illustrating the body of the lock made use of in the forms of the invention illustrated in Figs. 4, 5 and 6;

Fig. 8 is a view illustrating the anchor used in connection with the body illustrated in Fig. 7; and Fig. 9 is a view illustrating the body used with the lock shown in Figs. 1, 2 and 3.

By referring to the drawings, it will be seen that in the form of the invention illustrated in Figs. 1, 2 and 3 of the drawings, a dowel pin or tenon 11 extends from a member 10, this dowel pin or tenon 11 being normally secured in a mortise or opening 12 in a member 13 by means of my lock. The lock consists of a body 14 having a central slot or opening 15 and two additional openings 16 one disposed at each end of the slot or opening 15, these slots or openings 16 being adjacent fingers 17 which are normally disposed substantially parallel, as illustrated in Figs. 1, 2 and 3 of the drawings, and which are provided with pointed terminals 18 turned inwardly for engaging the sides of the dowel pin or tenon 11. When the fingers 17 are disposed at the sides of the dowel pin or tenon 11, and the dowel pin or tenon 11 is driven into the opening or mortise 12, it will be understood that the member 13 at the sides of the opening or mortise 12 will press the fingers 17 so that the inwardly bent and pointed terminals 18 will enter the sides of the dowel pin or tenon 11, as illustrated in Fig. 2 of the drawings. By this means the body 14 is secured to the dowel pin or tenon 11.

Projecting through the openings 16, there are pointed terminals 19 of an anchor 20, this anchor 20 having a loop portion 21 projecting through the opening or slot 15, so that it will engage the member 13 at the bottom 22 of the opening or mortise 12 when the dowel pin 11 is driven into the mortise or opening 12 in the member 13. When the loop portion 21 engages the member 13 at the bottom 22 of the mortise or opening 12, the bottom 22 will press the loop portion 21 in the direction of the dowel pin or tenon 11, by which means the pointed terminals 19 of the anchor 20 will be driven into the member 13 at the sides of the mortise or opening 12. It will, therefore, be understood that as the dowel pin 11 is driven in the mortise or opening 12, my fastener will not only be secured to the sides of the dowel pin or tenon 11, but also to the member 13 at the sides of the mortise or opening 12.

In the form of the invention illustrated in Figs. 4, 5, and 6, the body 23 has three fingers 24 and 25 which are disposed substantially at right angles when the fingers 24 and 25 are disposed in the same plane, before they are bent into operative position, where they will engage three sides of a tenon 26. The central opening 27 in the body 23 extends at three points 28 in the direction of the fingers 24 and 25, and there are openings 29 in the fingers 24 and 25, so that the three pointed terminals 30 of an anchor 31 may be disposed one at each of the openings 29 when the central portion of the anchor 31 is looped as illustrated in Fig. 4 of the drawings. The terminals 32 of the fingers 25 are pointed and are bent inwardly so that when the tenon 26 is driven into the mortise 33, the pointed terminals 32 of the fingers 24 and 25 will be driven into the three sides of the tenon 26, in the manner described, while the contact of the central portion of the anchor 31 with a member 34 at the bottom of the mortise 33 will press the anchor 31 against the tenon 26, thereby forcing the pointed terminals 30 of the anchor 31 into engagement with the sides of the member 34 at the mortise 33.

Having thus described my invention, I claim as new and desire to secure by Letters Patent:

1. In an article of the class described, a member having a body with three fingers disposed at an angle to the body and substantially parallel for disposal at three sides of a tenon, anchoring means on the fingers, there being an opening in the body and three additional openings one in each of the fingers, and an anchor having three fingers disposed under the body one at each of the additional openings, the central portion of the anchor being disposed out through the central opening, for the purpose specified.

2. A device for anchoring a tenon or the like in a mortise, comprising a plate having arms bent down therefrom, there being a hole through the plate between the bends, and a hole through each arm beyond the bends, and an anchor doubled through the middle hole and having its ends projecting through the holes in the arms.

ALVA BERNARD SMITH.